Patented Mar. 14, 1933

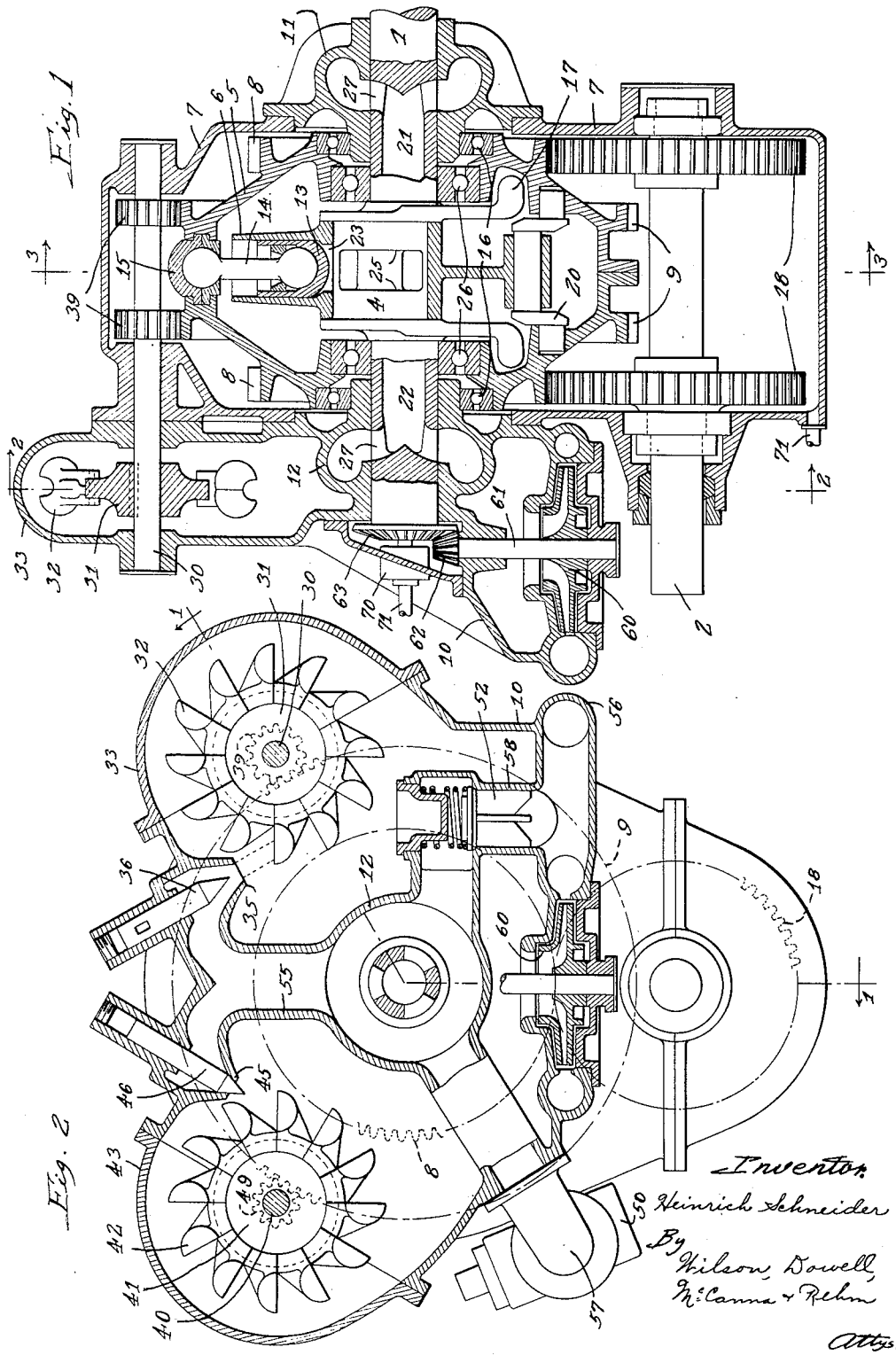

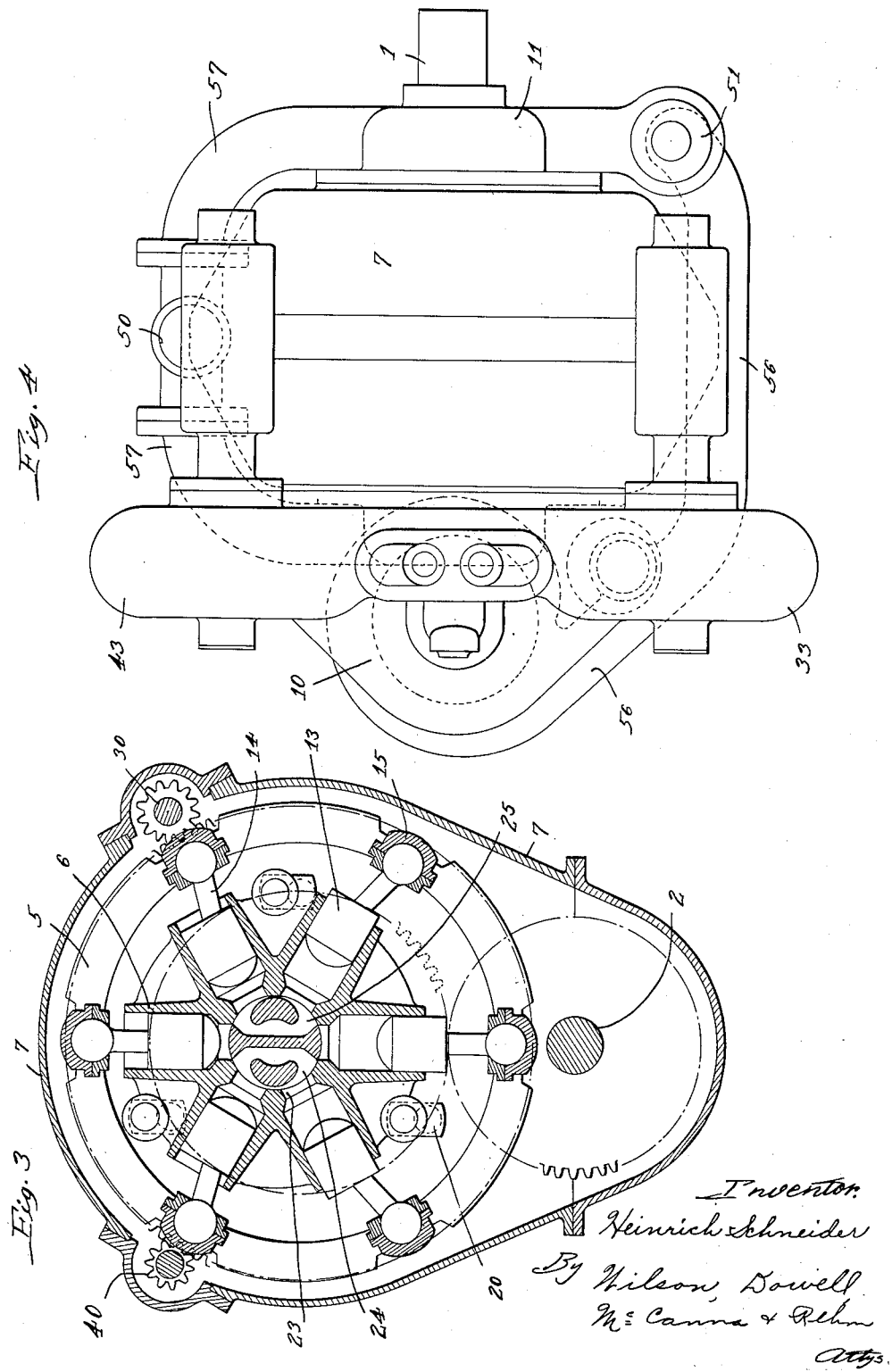

1,901,265

UNITED STATES PATENT OFFICE

HEINRICH SCHNEIDER, OF BELOIT, WISCONSIN

TRANSMISSION

Application filed July 7, 1928. Serial No. 291,075.

The present invention relates to improvements in transmissions, particularly of the hydraulic, variable speed, and the differential type.

While combinations of a turbine with a centrifugal pump, particularly with closed cycle, have been efficient and practical for transmissions with one fixed transmission ratio, they are not useful for a variable speed transmission, because they do not give the necessary variation of torque and speed with practical efficiency.

In opposition to them piston transmissions have shown efficient performance for variable speed transmission. The term "piston—pump or motor" is used in the description for pumps and motors with contractible and expansible chambers. The piston transmissions show the disadvantage that they cannot handle as great a volume as turbines and centrifugal pumps and become larger and more expensive in construction.

A combination of a piston pump or motor with a turbine or centrifugal pump seems not to promise advantages, because the piston types are efficient and economical only when operated with high pressure and relatively small volumes.

The present invention eliminates the above mentioned difficulties and handicaps of such a combination by combining a piston pump with an impulse-turbine. The latter is efficient at high pressure and at relatively small and variable volume, and the construction is small, light, and inexpensive.

As another particular feature of the invention the turbine may be a part of a differential transmission by which the whole power or any part of it, delivered from the driving shaft to the transmission can be transmitted directly to the driven shaft by the pump and the remaining part by the motor.

The turbine shows its particular advantages at low speed of the driven shaft of the differential transmission, when only a small amount of the power is transmitted directly to the driven shaft by the pump. In that way the pump delivers a large volume to the turbine, which easily can be consumed thereby giving a high torque. The turbine transmits the power, suitably by means of reduction gears, to the driven shaft.

In the constructional example of the invention turbines are shown as motors of a differential transmission.

The transmission type shown in the constructional example is of high power capacity, light in weight, highly efficient, and simple and practical in design and operation.

The particular features of the invention are set forth in the description of the constructional example illustrated in the accompanying drawings.

Fig. 1 shows a longitudinal section of the piston pump, turbine, and centrifugal pump, the section being taken on the line 1—1 of Fig. 2, Fig. 2 a cross section of the turbine case and the centrifugal pump, on the line 2—2 of Fig. 1, Fig. 3 a cross section of the piston pump, on the line 3—3 of Fig. 1, and Fig. 4 a top view of the transmission.

The piston pump shown in Figs. 1 and 3 comprises a crankshaft 1, a stationary casing 7, two stuffing-box-casings 11 and 12, a cylinder rotor 6, comprising six radially arranged cylinders, and a rotor 5 surrounding said cylinder rotor 6. Pistons 13 in said cylinders are operatively connected with rotor 5 by means of connecting rods 14 and bearings 15.

The crankshaft 1 of the pump is a hollow shaft provided with a crank 4 and counterweights 17, having channels 21 and 22 for admission and discharge of the operating oil to and from the cylinders. The cylinder rotor 6 is rotatably mounted on the crankpin 4 and provided with ports 23 communicating with controlling ports 24 and 25 formed in the hollow crankpin 4, the latter in turn communicating with channels 21 and 22 respectively. Rotor 5 is rotatably mounted on the stationary casing 7 by means of ball bearings 16 on the stuffing box casings 11 and 12, and is provided with two sets of gear tooth portions 8 and 9. The crankshaft 1 is rotatably mounted by means of ball bearings 26 in rotor 5. The channels 21 and 22 of the crankshaft communicate with the stuffing box casings 11 and 12 respectively by ports 27. The two rotors 5 and 6 are operatively connected by three auxiliary cranks 20 which have the same eccentricity as the crank shaft 1. Rotor 5 consists of two parts bolted together.

A driven shaft 2 is arranged below the piston pump provided with two gears 18 which mesh with gears 8 of rotor 5.

Two impulse turbines are provided, geared with rotor 5 of the piston pump. The turbines comprise shafts 30, 40, wheels 31, 41, buckets 32, 42, surrounded by cases 33, 43. On the turbine shafts are gears 39, 49, meshing with gears 9 of rotor 5 of the pump.

A centrifugal pump 60 is provided on a vertical shaft driven by bevel gears 62, 63, from crankshaft 1. The oil enters the piston pump thru channel 21 and discharges thru channel 22 in the stuffing box casing 12 which is provided with a pipe 55 communicating with the turbine nozzles 35 and 45. The nozzles can be opened or closed by means of needle valves 36, 46, which will be operated by any desired means.

Above the centrifugal pump 60 an oil reservoir is provided within casing 10 cast integral with stuffing box casing 12. The centrifugal pump discharges the oil thru pipe 56 to stuffing box casing 11 and thru channel 21 and port 23 to the cylinders 6. The cylinders discharge the oil thru port 24, channel 22 and stuffing box casing 12, pipe 55 and turbine nozzle 35 or 45 to the turbine blades, from which the oil drops into the reservoir in casing 10 and is again sucked from it by the centrifugal pump 60, completing the cycle.

The turbine on shaft 30 is provided for running forward, turbine on shaft 40 for running reverse. The diameter of gear 49 of the reverse turbine is smaller than the one of the forward turbine to provide a larger reduction of speed and higher torque for reverse drive.

Suction and discharge stuffing boxes 11 and 12 are connected by means of pipe 57 in which is arranged an idling or by-pass valve 50.

A further connecting pipe 58 between the centrifugal pump discharge pipe 56 and stuffing box casing 12 is provided and two check valves 51 and 52 of the same design are provided in pipe 56 and pipe 58, to prevent a back flow of the oil from both the stuffing-box-casings to the centrifugal pump and allowing a delivery of oil from the centrifugal pump into the stuffing-box-casings at lower pressure.

A gear pump 70 driven from the crankshaft 1 pumps the leakage oil from the bottom of casing 7 to reservoir case 10 through pipe 71.

The piston pump of the illustrated differential transmission can act as pump and coupling between the driving shaft and driven shaft.

With the idling valve 50 opened and the turbine nozzles 35 and 45 shut, the piston pump discharges the oil thru pipe 57 to its suction side and rotor 5 and the driven shaft stand still. With the idling valve 50 and the nozzle 45 of the reverse turbine shut and nozzle 35 of the forward turbine opened, the piston pump discharges oil thru the nozzle 35 to impinge upon the turbine, driving the rotor 5 in the same direction as crankshaft 1 turns. The smaller the difference in revolutions of crankshaft and rotor 5 grows, the less oil will be discharged by the piston pump. By gradually closing the turbine nozzle 35 by means of needle valve 36 the rotation of rotor 5 increases and when fully shut so that no oil can be discharged by the piston pump, rotor 5 is coupled with the crankshaft by means of the oil, blocked in the cylinders 6.

With the idling valve 50 and the nozzle 35 of the forward turbine shut and nozzle 45 of the reverse turbine opened, the oil is discharged upon the reverse turbine, causing a reverse rotation of rotor 5 and driven shaft 2. The faster the rotation of rotor 5 grows in reverse direction the greater the difference in the revolutions of the crankshaft and rotor 5 becomes and that increases the amount of discharged oil and the power delivered from the turbine.

The fact that the nozzle 35 cooperates with the turbine 32 for forward drive, whereas the nozzle 45 cooperates with the turbine 42 for reverse drive, makes it possible to utilize the one turbine to exert a braking effect upon the other. That is to say, the nozzles while arranged to be opened selectively for forward or reverse drive may be opened simultaneously and the one adjusted with respect to the other to control the speed of operation and direction of rotation of the driven member and also control the extent of the braking effect of either turbine.

I claim:

1. In a transmission, the combination of a stationary casing, a driving shaft received in bearings in said casing, a driven shaft also received in bearings in said casing in parallelism with the driving shaft, a piston pump in said casing comprising a crank eccentrically disposed on the driving shaft, a cylinder rotor bearing on the crank, a piston rotor concentric with the driving shaft, the two rotors having crank connections with one another, and pistons flexibly connected with said piston rotor and operating in cylinders of the other rotor, said crank having separated chambers provided therein, the one communicating with a passage in one part of the driving shaft and the other with another passage in the other part of the driving shaft for admission and discharge of fluid to and from the cylinders, two stuffing box casings one communicating with the one passage and the other with the other passage of said driving shaft, a countershaft in said casing parallel with the driving shaft having a gearing connection with the piston rotor, a turbine for driving the countershaft, adjustable means providing for the delivery of fluid from the discharge stuffing box casing to the turbine for operation thereof, means for bypassing fluid from the discharge stuffing box casing to the other stuffing box casing, and means providing a gearing connection between the piston rotor and the driven shaft.

2. A transmission as set forth in claim 1 wherein the countershaft has a driving connection with the piston rotor of one ratio and the piston rotor has a driving connection with the driven shaft of another ratio such that a reduction drive is provided between the countershaft and the driven shaft.

3. A transmission as set forth in claim 1 wherein the turbine driving the countershaft provides for a drive in one direction, the transmission including another countershaft in said casing having a gearing connection with the piston rotor, another turbine for driving the last mentioned countershaft in the opposite direction, and adjustable means for delivering fluid from the discharge stuffing box casing to the last mentioned turbine.

4. A transmission as set forth in claim 1 including another counter-shaft in said casing having a gearing connection with the piston rotor of different ratio than the other driving connection between the other counter-shaft and the piston rotor, another turbine for driving said second countershaft, and adjustable means for delivering fluid from the discharge stuffing box casing to said turbine.

5. A transmission as set forth in claim 1 wherein the turbine recited is one of a plurality of turbines, each having a different ratio driving connection with the driven shaft and an adjustable means for delivering fluid thereto from the discharge stuffing box casing, and arranged to be thrown selectively into operation to transmit drive to the piston rotor as desired.

6. A transmission as set forth in claim 1 including a reservoir for receiving the fluid discharged from the turbine and a pump communicating with said reservoir and driven through a connection with the driving shaft and arranged to deliver the fluid from the reservoir to the intake stuffing box casing.

7. A transmission as set forth in claim 1 including a reservoir adjacent one end of the driving shaft, a centrifugal pump disposed in the bottom of and communicating with the reservoir having a gearing connection with the driving shaft, and means providing communication between the discharge side of the centrifugal pump and the intake stuffing box casing.

8. A transmission as set forth in claim 1 including a reservoir adjacent one end of the driving shaft arranged to receive the fluid discharged from the turbine, a pump disposed in the bottom of and communicating with the reservoir driven by the driving shaft and arranged to deliver the fluid from the reservoir under pressure to the intake stuffing box casing, and another pump also driven by the driving shaft having communication with the bottom of the stationary casing and arranged to deliver fluid therefrom to the reservoir.

9. In a transmission, the combination of a stationary casing, a driving shaft received in bearings in said casing, a driven shaft also received in bearings in said casing, a piston pump in said casing comprising a crank eccentrically disposed on the driving shaft, a cylinder rotor bearing on the crank, a piston rotor concentric with the driving shaft and serving to drive the driven shaft, the two rotors having off-center driving connections with one another, and pistons flexibly connected with said piston rotor and operating in cylinders of the other rotor, said crank having separated chambers provided therein, the one communicating with a passage in one part of the driving shaft and the other with another passage in the other part of the driving shaft for admission and discharge of fluid to and from the cylinders, two stuffing box casings one communicating with the one passage and the other with the other passage of said driving shaft, a counter-shaft in said casing parallel with the driving shaft having a gearing connection with the piston rotor, a turbine for driving the counter-shaft, adjustable means providing for the delivery of fluid from the discharge stuffing box casing to the turbine for operation thereof, and means for bypassing the fluid from the discharge stuffing box casing to the intake stuffing box casing.

10. In a hydraulic transmission, the combination of driving and driven members, a differential pump comprising a crank driven by the driving member, an inner cylinder rotor bearing on the crank, an outer piston rotor eccentric with relation to the inner rotor but having a driving connection therewith and serving to drive the driven member, and pistons flexibly connected with the outer rotor and operating in cylinders of the inner rotor, a turbine having a driving connection with the driven member for transmitting its torque thereto, said driving connection being afforded through a step-down gearing connection with the outer rotor, the same comprising a pinion driven by the turbine meshing with a toothed rim provided on the outer rotor, and an adjustable nozzle for discharging fluid from the pump to operate the turbine, said nozzle being arranged to be controlled to determine the power transmission ratio between the driving and driven members.

11. In a hydraulic transmission, the combination of driving and driven members, a differential pump comprising a crank driven by the driving member, an inner cylinder rotor bearing on the crank, an outer piston rotor eccentric with relation to the inner rotor but having a driving connection therewith and serving to drive the driven member, and pistons flexibly connected with the outer rotor and operating in cylinders of the inner rotor, separate and independent turbines each having a different ratio driving connection with the driven member, the driving connection in each instance being afforded by a step-down gearing connection with the outer rotor, the same comprising a pinion driven by the turbine and meshing with a toothed rim provided on the outer rotor, and adjustable nozzles for discharging fluid from the pump selectively to said turbines, whereby to provide a desired power transmission ratio between the driving and driven members.

12. In a hydraulic transmission, the combination of driving and driven members, a differential pump comprising a crank driven by the driving member, an inner cylinder rotor bearing on the crank, an outer piston rotor eccentric with relation to the inner rotor but having a driving connection therewith and serving to drive the driven member, and pistons flexibly connected with the outer rotor and operating in cylinders of the inner rotor, separate and independent forward and reverse drive turbines having driving connections with said driven member, the driving connections in each case being afforded by a step-down gearing connection between the turbine and the outer rotor, the same comprising a pinion driven by the turbine meshing with a toothed rim provided on the outer rotor, and adjustable nozzles for discharging fluid from the pump to said turbines selectively, whereby to afford forward or reverse drive at a desired power transmission ratio between the driving and driven members.

13. In a transmission of the character described, the combination of driving and driven members, a differential pump comprising a hollow crank shaft driven by the driving member, a cylinder block mounted on the eccentric portion of said shaft, a rotor concentric with the axis of rotation of said shaft and eccentric with respect to the cylinder block, and pistons flexibly connected with the rotor and operating in the cylinders of said block, stationary high and low pressure chambers communicating with the hollow crank shaft for admission and discharge of fluid to and from the cylinders through said crank shaft, a stationary housing enclosing substantially all of the structure above set forth, a turbine in said housing having a reduction gearing driving connection with the driven member for operation of the latter, and a nozzle for discharging fluid to operate the turbine, said nozzle having communication with the aforesaid high pressure chamber, the aforesaid low pressure chamber having means of communication with the housing for withdrawal of the spent fluid from the turbine.

14. In a transmission of the character described, the combination of driving and driven members, a differential pump comprising a hollow crank shaft driven by the driving member, a cylinder block mounted on the eccentric portion of said shaft, a rotor concentric with the axis of rotation of said shaft and eccentric with respect to the cylinder block, and pistons flexibly connected with the rotor and operating in the cylinders of said block, stationary high and low pressure chambers, communicating with the hollow crank shaft for admission and discharge of fluid to and from the cylinders through said crank shaft, a stationary housing enclosing substantially all of the structure above set forth, a turbine in said housing having a reduction gearing driving connection with the driven member for operation of the latter, a nozzle for discharging fluid to operate the turbine, said nozzle being in communication with the aforesaid high pressure chamber for delivery of fluid therefrom, and a pump in said housing having a driving connection with the aforesaid crank shaft and communicating with the aforesaid low pressure chamber for conducting spent fluid from the turbine to said chamber.

15. A transmission as set forth in claim 13 including another turbine in said housing having a different ratio driving connection with the driven member, and a separate nozzle for discharging fluid to operate said turbine, the same communicating with the high pressure chamber, the nozzles for the two turbines being arranged to be opened selectively, whereby to provide a desired power transmission ratio between the driving and driven members.

16. A transmission as set forth in claim 13 including another turbine in said housing having a reduction driving connection with the driven member but adapted to operate the same in the opposite direction with relation to the drive afforded by the other turbine, and a nozzle for discharging fluid to operate said turbine in the proper direction for such reverse drive, said nozzle also communicating with the high pressure chamber, the said nozzles being arranged to be opened selectively, for forward or reverse drive.

17. A transmission as set forth in claim 13 including another turbine in said housing having a reduction driving connection with the driven member but adapted to operate the same in the opposite direction with relation to the drive afforded by the other turbine, and a nozzle for discharging fluid to operate said turbine in the proper direction for such reverse drive, said nozzle also communicating with the high pressure chamber, the said nozzles being arranged to be opened selectively, for forward or reverse drive, and being arranged also to be opened so as to cause the one turbine to exert a braking effect upon the turning of the driven member, the said nozzles being adjustable to control the speed of operation and direction of rotation of the driven member and also control the extent of the braking effect of either turbine.

18. A transmission as set forth in claim 13 wherein the driven member has a gearing connection with the rotor of the differential pump, whereby to provide a double ratio gearing connection between the turbine and the driven member, one of said gearing connections being between the turbine and the rotor and the other between the rotor and the driven member.

19. A transmission as set forth in claim 13 including another turbine having a reduction driving connection with the driven member but arranged to drive the same in the opposite direction with relation to the drive afforded by the other turbine, and a nozzle communicating with the high pressure chamber for discharging fluid to operate said turbine in the proper direction for such reverse drive, said turbines and their nozzles being symmetrically arranged on either side of a vertical axial plane with relation to the driven member, and having a common channel affording communication between the high pressure chamber and the nozzles, the turbines being also arranged to have the spent fluid discharged therefrom into a common chamber provided therefor in the housing.

HEINRICH SCHNEIDER.